US012733679B2

(12) United States Patent
Li et al.

(10) Patent No.: US 12,733,679 B2
(45) Date of Patent: Sep. 15, 2026

(54) AEROSOL GENERATING DEVICE AND CONTROL METHOD

(71) Applicant: SHENZHEN FIRST UNION TECHNOLOGY CO., LTD., Shenzhen (CN)

(72) Inventors: Xinjun Li, Shenzhen (CN); Peixia Yu, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 472 days.

(21) Appl. No.: 18/255,107

(22) PCT Filed: Dec. 8, 2021

(86) PCT No.: PCT/CN2021/136483

§ 371 (c)(1),
(2) Date: May 31, 2023

(87) PCT Pub. No.: WO2022/121947

PCT Pub. Date: Jun. 16, 2022

(65) Prior Publication Data

US 2024/0023621 A1 Jan. 25, 2024

(30) Foreign Application Priority Data

Dec. 8, 2020 (CN) ........................ 202011442641.4

(51) Int. Cl.
*A24F 40/465* (2020.01)
*A24F 40/53* (2020.01)
(Continued)

(52) U.S. Cl.
CPC ............ *A24F 40/465* (2020.01); *A24F 40/53* (2020.01); *H05B 6/108* (2013.01); *H05B 6/365* (2013.01)

(58) Field of Classification Search
None
See application file for complete search history.

(56) References Cited

U.S. PATENT DOCUMENTS

| | | | | |
|---|---|---|---|---|
| 4,277,667 | A | 7/1981 | Kiuchi | |
| 6,124,581 | A | 9/2000 | Ulrich | |
| 2019/0200677 | A1 * | 7/2019 | Chong | A24D 1/02 |

FOREIGN PATENT DOCUMENTS

| | | | |
|---|---|---|---|
| CN | 110476478 | A | 11/2019 |
| JP | 2020512662 | A | 4/2020 |

(Continued)

*Primary Examiner* — Phu H Nguyen
(74) *Attorney, Agent, or Firm* — PROI Intellectual Property US

(57) ABSTRACT

Provided is vapor generation device and a control method thereof, the vapor generation device including a susceptor, configured to be penetrated by a changing magnetic field to generate heat to heat a vapor generation product; an oscillator, including an inductance coil and a capacitor and configured to guide a changing current to flow through the inductance coil to drive the inductance coil to generate the changing magnetic field; a peak detection unit, configured to detect a peak voltage of the oscillator; and a controller, configured to control the oscillator to guide a current based on the peak voltage. The vapor generation device detects a peak voltage of the oscillator during oscillation and controls the oscillation of the oscillator according to the peak voltage.

16 Claims, 8 Drawing Sheets

(51) Int. Cl.
*H05B 6/10* (2006.01)
*H05B 6/36* (2006.01)

(56) References Cited

FOREIGN PATENT DOCUMENTS

| | | | | |
|---|---|---|---|---|
| KR | 20190130022 | A | 11/2019 | |
| KR | 20200009993 | A | 1/2020 | |
| WO | 2018153171 | A1 | 8/2018 | |
| WO | WO-2020182760 | A1 * | 9/2020 | ............. H05B 6/108 |

* cited by examiner

AEROSOL GENERATING DEVICE AND CONTROL METHOD

CROSS-REFERENCE TO RELATED APPLICATIONS

This application claims priority to Chinese Patent Application No. 202011442641.4, filed with the China National Intellectual Property Administration on Dec. 8, 2020 and entitled "VAPOR GENERATION DEVICE AND CONTROL METHOD", which is incorporated herein by reference in its entirety.

TECHNICAL FIELD

Embodiments of this application relate to the technical field of heat-not-burn low-temperature cigarette devices, and in particular, to a vapor generation device and a control method.

BACKGROUND

Tobacco products (such as cigarettes and cigars) burn tobacco during use to produce tobacco smoke. Attempts are made to replace these tobacco-burning products by manufacturing products that release compounds without burning.

An example of this type of products is a heating device that releases compounds by heating rather than burning materials. For example, the materials may be tobacco or other non-tobacco products. These non-tobacco products may include or may not include nicotine. In an existing device, a heater that generates heat through electromagnetic induction heats tobacco products, to generate an aerosol for inhalation. In an embodiment of the related art for the above heating device, the patent No. 201580007754.2 provides an induction heating device for heating a special cigarette product through electromagnetic induction. Specifically, an induction coil and a capacitor are connected in series or in parallel to form an LC oscillation to form an alternating current, so that the coil generates an alternating magnetic field to induce the susceptor to generate heat and heat the cigarette products.

SUMMARY

Embodiments of this application provide a vapor generation device, configured to heat a vapor generation product to generate an aerosol for inhalation, and including:

- a susceptor, configured to be penetrated by a changing magnetic field to generate heat, to heat the vapor generation product;
- an oscillator, including an inductance coil and a capacitor, and configured to guide a changing current to flow through the inductance coil to drive the inductance coil to generate the changing magnetic field;
- a peak detection unit, configured to detect a peak voltage of the oscillator; and
- a controller, configured to control the oscillator to guide the changing current based on the peak voltage.

The above vapor generation device, detects a peak voltage of the oscillator during oscillation, and controls the oscillator to guide the changing current according to the peak voltage.

Further, the above circuit term "oscillator" is a circuit module that is formed by a capacitor and an inductor and that can generate a periodically changing current and voltage. The term "peak voltage" is a maximum value of the changing voltage in a period.

In a preferred implementation, the peak detection unit includes:

- a hold capacitor, configured to hold the peak voltage of the oscillator.

In a preferred implementation, the peak detection unit includes:

- an operational amplifier, located between the hold capacitor and the oscillator, and further configured to output a voltage of the oscillator to the hold capacitor; and
- a voltage follower, configured to output the peak voltage of the oscillator held by the hold capacitor.

In a preferred implementation, the peak detection unit further includes:

- a discharge switch, configured to discharge the hold capacitor in an on state.

In a preferred implementation, a sampling end of the operational amplifier is connected to the oscillator; and

- the hold capacitor includes three paths, where a first path is connected to an output end of the operational amplifier, a second path is connected to the discharge switch, and a third path is connected to a sampling end of the voltage follower.

In a preferred implementation, the oscillator is a parallel LC oscillator including the inductance coil and the capacitor connected in parallel; and

- the controller is configured to drive, using a pulse with a changing frequency, the parallel LC oscillator to oscillate, determine an optimal frequency of the parallel LC oscillator according to the peak voltage detected by the peak detection unit, and control the parallel LC oscillator to guide the changing current according to the optimal frequency.

In a preferred implementation, the controller is configured to determine the optimal frequency of the parallel LC oscillator in a case that the peak voltage detected by the peak detection unit is the same as or basically close to a preset threshold voltage.

In a preferred implementation, in the pulse with a changing frequency, the frequency gradually changes in descending order.

In a preferred implementation, the oscillator is a parallel LC oscillator including the inductance coil and the capacitor connected in parallel; and

- the controller is configured to drive, using a pulse with a changing duty ratio, the parallel LC oscillator to oscillate, determine an optimal duty ratio of the parallel LC oscillator according to the peak voltage detected by the peak detection unit, and control the parallel LC oscillator to guide the changing current according to the optimal duty ratio.

In a preferred implementation, the controller is configured to determine the optimal duty ratio of the parallel LC oscillator in a case that the peak voltage detected by the peak detection unit is the same as or basically close to a preset threshold voltage.

In a preferred implementation, in the pulse with a changing duty ratio, the duty ratio gradually changes in ascending order.

In a preferred implementation, the oscillator is a serial LC oscillator or a serial LCC oscillator including the inductance coil and the capacitor connected in series; and

- the controller is configured to drive, using a pulse with a changing frequency, the oscillator to oscillate, and determine a resonance frequency of the oscillator according to the peak voltage detected by the peak detection unit.

In a preferred implementation, in the pulse with a changing frequency, the duty ratio is 50%, and the frequency gradually changes in descending order.

In a preferred implementation, the controller is configured to determine the resonance frequency of the oscillator in a case that the peak voltage detected by the peak detection unit is maximum.

Another embodiment of this application further provides a control method for a vapor generation device, the vapor generation device including:

a susceptor, configured to be penetrated by a changing magnetic field to generate heat, to heat the vapor generation product; and an oscillator, including an inductance coil and a capacitor, and configured to guide a changing current to flow through the inductance coil to drive the inductance coil to generate the changing magnetic field; and the method including:

detecting a peak voltage of the oscillator; and determining an oscillation frequency of the oscillator according to the peak voltage.

In a preferred implementation, adjusting the oscillation frequency of the oscillator, so that the oscillation frequency is kept the same as or basically close to a preset frequency.

Another embodiment of this application further provides a control method for a vapor generation device, the vapor generation device including:

a susceptor, configured to be penetrated by a changing magnetic field to generate heat, to heat the vapor generation product; and a parallel LC oscillator, including an inductance coil and a capacitor connected in parallel, and configured to guide a changing current to flow through the inductance coil to drive the inductance coil to generate a changing magnetic field; and the method including:

driving the parallel LC oscillator to oscillate according to a pulse with a gradually changing frequency or duty ratio;

detecting a peak voltage of the parallel LC oscillator;

comparing the peak voltage with a preset threshold voltage, and determining an optimal frequency or an optimal duty ratio of the parallel LC oscillator in a case that the peak voltage is the same as or basically close to the preset threshold voltage; and driving the parallel LC oscillator to oscillate according to the optimal frequency or the optimal duty ratio, so that the inductance coil generates the changing magnetic field.

Another embodiment of this application further provides a control method for a vapor generation device, the vapor generation device including:

a susceptor, configured to be penetrated by a changing magnetic field to generate heat, to heat the vapor generation product; and a serial LC oscillator or a serial LCC oscillator with an inductance coil, configured to guide a changing current to flow through the inductance coil to drive the inductance coil to generate the changing magnetic field; and the method including:

driving the serial LC oscillator or the serial LCC oscillator to oscillate according to a pulse with a constant duty ratio of 50% and a gradually changing frequency;

detecting a peak voltage of the serial LC oscillator or the serial LCC oscillator;

determining a resonance frequency of the serial LC oscillator or the serial LCC oscillator according to a maximum value of the peak voltage; and driving, according to the resonance frequency, the serial LC oscillator or the serial LCC oscillator to oscillate, so that the inductance coil generates the changing magnetic field.

In a preferred implementation, in the pulse with a gradually changing frequency, the frequency gradually changes in descending order.

In a preferred implementation, the step of determining the peak voltage is a maximum value includes:

performing a difference operation on a currently detected peak voltage and a previously detected peak voltage;

determining whether a difference value is positive; and if the difference value is positive, reducing the oscillation frequency of driving the serial LC oscillator or the serial LCC oscillator; or if the difference value is not positive, determining the previously detected peak voltage as the maximum value.

In a preferred implementation, the step of reducing the oscillation frequency of driving the serial LC oscillator or the serial LCC oscillator includes:

determining whether the difference value is greater than a preset value; and if the difference value is greater than the preset value, reducing the oscillation frequency of driving the serial LC oscillator or the serial LCC oscillator according to a first amplitude; or if the difference value is not greater than the preset value, reducing the oscillation frequency of driving the serial LC oscillator or the serial LCC oscillator according to a second amplitude, where the first amplitude is greater than the second amplitude.

Another embodiment of this application further provides a vapor generation device, configured to heat a vapor generation product to generate an aerosol for inhalation, including:

a parallel LC oscillator, including an inductance coil and a capacitor connected in parallel, and configured to guide a changing current to flow through the inductance coil to drive the inductance coil to generate a changing magnetic field;

a susceptor, configured to be penetrated by the changing magnetic field to generate heat, to heat a vapor generation product received in a cavity;

a transistor switch; and a controller, configured to control on and off of the transistor switch by using a pulse, so as to drive the parallel LC oscillator to oscillate, to guide the changing current to flow through the inductance coil, where a duty ratio of the pulse is greater than 50%.

In a preferred implementation, the duty ratio of the pulse is greater than 70%.

BRIEF DESCRIPTION OF THE DRAWINGS

One or more embodiments are exemplarily described with reference to the corresponding figures in the accompanying drawings, and the descriptions are not to be construed as limiting the embodiments. Components in the accompanying drawings that have same reference numerals are represented as similar components, and unless otherwise particularly stated, the figures in the accompanying drawings are not drawn to scale.

DETAILED DESCRIPTION

For ease of understanding of this application, this application is described in more detail below with reference to the accompanying drawings and specific implementations.

Figure 1:
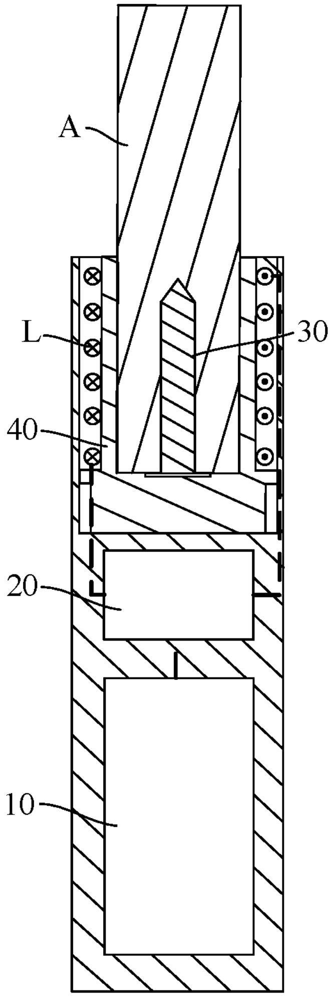
FIG. 1 is a schematic structural diagram of a vapor generation device according to an embodiment of this application.

An embodiment of this application provides a vapor generation device whose construction may refer to FIG. 1, including:

- a cavity, an aerosol generation product A being removably received in the cavity;
- an inductance coil L, configured to generate a changing magnetic field under an alternating current;
- a susceptor 30, where at least a part of the susceptor extends in the cavity, and the susceptor is configured to be inductively coupled to the inductance coil L, and be penetrated by the changing magnetic field to generate heat, to heat the aerosol generation product A such as a cigarette, so that at least a component of the aerosol generation product A is evaporated, to form an aerosol for inhalation;
- a cell 10, being a rechargeable direct current cell, and being capable of outputting a direct current; and
- a circuit 20, connected to the rechargeable cell 10 through a suitable current, and configured to convert the direct current outputted by the cell 10 into an alternating current with a suitable frequency and supply the alternating current to the inductance coil L.

According to settings used in a product, the inductance coil L may include a cylindrical inductance coil wound into a spiral shape, as shown in FIG. 1. The cylindrical inductance coil L wound into a spiral shape may have a radius r ranging from about 5 mm to about 10 mm, and the radius r may be about 7 mm in particular. The cylindrical inductance coil L wound into a spiral shape may have a length ranging from about 8 mm to about 14 mm, and a number of turns of the inductance coil L may range from 8 to 15. Correspondingly, an inner volume may range from about 0.15 $cm^3$ to about 1.10 $cm^3$.

In a more preferred implementation, the frequency of the alternating current supplied by the circuit 20 to the inductance coil L ranges from 80 KHz to 400 KHz; and more specifically, the frequency may be in a range of about 200 KHz to 300 KHz.

In a preferred embodiment, a direct current voltage provided by the cell 10 ranges from about 2.5 V to about 9.0 V, and the direct current provided by the cell 10 ranges from about 2.5 A to about 20 A.

In a preferred embodiment, the susceptor 30 is substantially in a shape of a pin or a blade, which is conducive to inserting into the aerosol generation product. In addition, the susceptor 30 may have a length of about 12 mm, a width of about 4 mm, and a thickness of about 0.5 mm, and may be made of stainless steel of level 430 (SS430). In an alternative embodiment, the susceptor 30 may have a length of about 12 mm, a width of about 5 mm, and a thickness of about 0.5 mm, and may be made of stainless steel of level 430 (SS430). In another variant embodiment, the susceptor 30 may also be constructed as a cylindrical or tubular shape; and a cavity for receiving the aerosol generation product A is formed at an internal space of the susceptor during use, and an aerosol for inhalation is generated by heating a periphery of the aerosol generation product A. These susceptors may also be made of stainless steel of level 420 (SS420) and alloy materials containing iron or nickel (such as permalloy).

In an embodiment shown in FIG. 1, the vapor generation device further includes a holder 40 configured to arrange the inductance coil L and the susceptor 30, and a material of the holder 40 may include a non-metal material with high temperature resistance such as PEEK or ceramic. During implementation, the inductance coil L winds around an outer wall of the holder 40 for fixing. In addition, according to FIG. 1, the holder 40 has a hollow tubular shape, and a part of the hollow tubular space forms the cavity for receiving the aerosol generation product A.

In an optional implementation, the susceptor 30 is prepared by using the above susceptive material, or is obtained by forming a susceptive material coating on an outer surface of a substrate material with high temperature resistance, such as ceramic, by electroplating, deposition, or in other manners.

Figure 2:
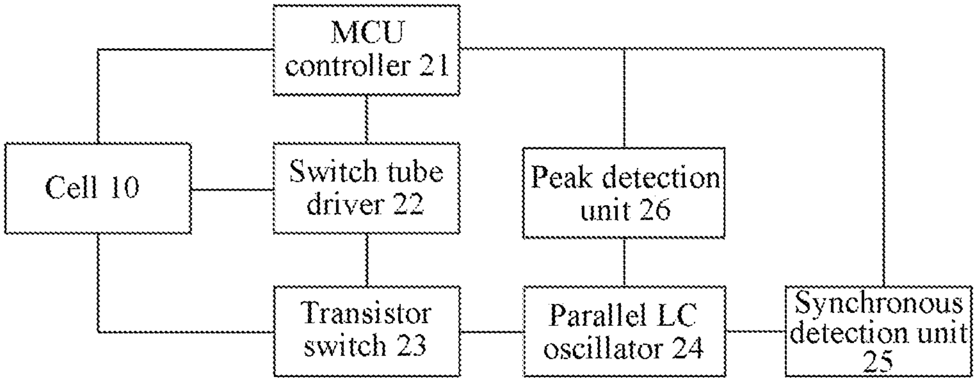
FIG. 2 is a structural block diagram of an embodiment of a circuit in FIG. 1.
Figure 3:
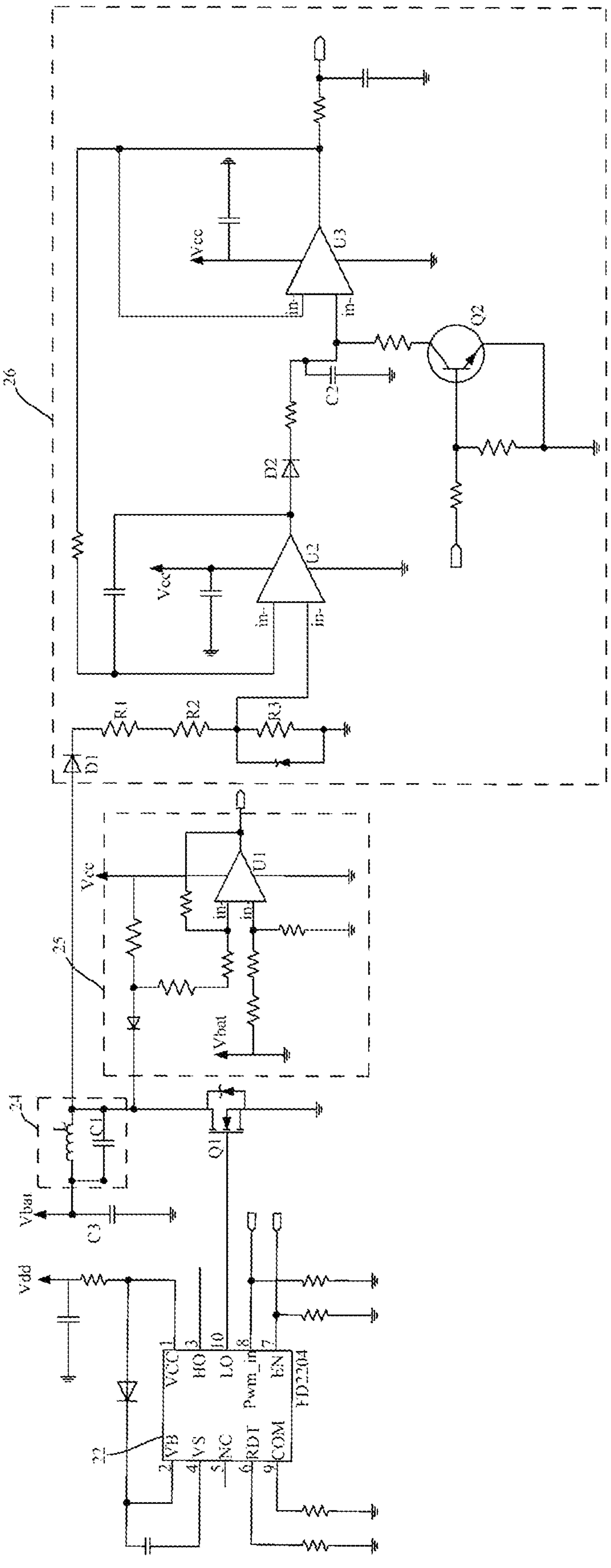
FIG. 3 is a schematic diagram of basic components of an embodiment of the circuit in FIG. 2.

For a structure and basic components of the circuit 20 in a preferred implementation, refer to FIG. 2 and FIG. 3, which includes:

- a parallel LC oscillator 24, specifically formed by a capacitor C1 and the inductance coil L connected in parallel, and provided with a pulse voltage for oscillation to generate a changing current provided to the inductance coil L, thereby generating a changing magnetic field to induce the susceptor 30 to generate heat.

A transistor switch 23 includes a switch tube Q1, and is alternately turned on and turned off, to guiding a current between the cell 10 and the parallel LC oscillator 24 to cause the parallel LC oscillator 24 to oscillate to generate the changing current flowing through the inductance coil L, so as to cause the inductance coil L to generate the changing magnetic field. Certainly, in a preferred implementation shown in FIG. 3, the switch tube Q1 is a commonly-used MOS tube switch. In connection, the MOS tube switch is turned on/off by receiving a PWM driving signal of a switch tube driver 22 according to a G electrode.

Further, in a preferred implementation, the on and off of the transistor switch 23 is controlled by a driving signal of the switch tube driver 22. Certainly, the driving signal of the switch tube driver 22 is transmitted based on a received pulse control signal in a PWM manner transmitted by an MCU controller 21.

Figure 4:
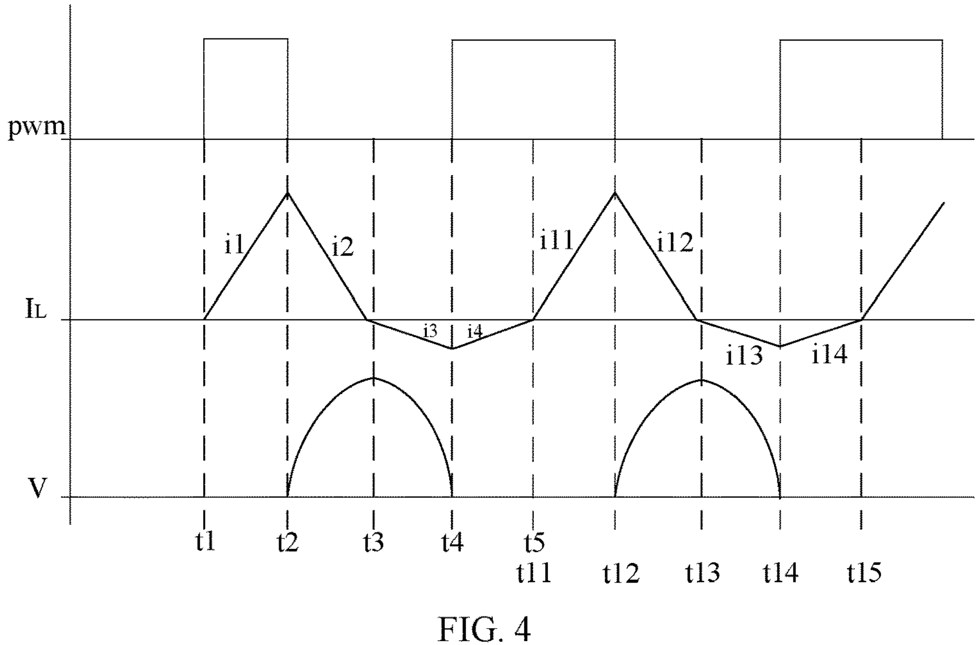
FIG. 4 is a schematic diagram of a changing voltage and a changing current during oscillation of a parallel LC oscillator in FIG. 2.

In a preferred implementation, an on time and an off time of the switch tube Q1 are different, that is, a duty ratio during oscillation of the parallel LC oscillator 24 controlled in a PWM manner is not 50%. In other words, a process of oscillation of the parallel LC oscillator 24 is asymmetrical, so that the parallel LC oscillator 24 maintains an enough oscillation voltage to keep an intensity of the magnetic field. In a preferred implementation, a duty ratio of controlling the switch tube Q1 to be turned on in a PWM manner ranges from about 70% to 80%. Specifically, FIG. 4 shows an oscillation current/voltage changing process within a period from t1 to t5, in a case that the parallel LC oscillator 24 of the circuit 20 shown in FIG. 3 is driven in a symmetrical resonance manner with a duty ratio of 50%, which includes the following periods.

S1: During a time period from t1 to t2: the switch tube driver 22 transmits a PWM pulse driving signal to the G electrode of the MOS tube Q1 to saturate and turn on the MOS tube. After the MOS tube is turned on, a current it flows from a positive electrode of the cell 10 through the inductance coil L, and inductive reactance of the coil does not allow a sudden change of the current, therefore, during the time period from t1 to t2, the inductance coil L is charged to form linearly increasing current i1.

S2: During a time period from t2 to t3: at a moment t2, the PWM pulse finishes, the MOS tube Q1 is turned off, also, under the action of the inductive reactance of the inductance coil L, the current cannot immediately become zero, but charges the capacitor C1 to generate a current i2 charging the capacitor C1.

Until a moment t3, the capacitor C1 is fully charged, and the current becomes zero. In this case, magnetic field energy of the inductance coil L is fully converted into electric field energy of the capacitor C1, two ends of the capacitor C1 reach a peak voltage, and a voltage formed between a D electrode/S electrode of the MOS tube Q1 is actually a sum of a peak voltage of a reverse phase pulse and an output voltage of the positive electrode of the cell 10.

S3: During a time period from t3 to t4: the capacitor C1 discharges through the inductance coil L until completion, i3 reaches a maximum value, and voltages of two ends of the capacitor C1 gradually decrease to zero. In this case, electric energy in the capacitor C1 fully converts into magnetic energy in the inductance coil L. Similarly, under the action of the inductive reactance, the current flowing through the inductance coil L gradually changes and has a flowing direction opposite to the above directions in S1 and S2; and the capacitor C1 discharges until electromotive forces at the two ends of the inductance coil L are reversed.

S4: During a time period from t4 to t5: at a moment t4, the MOS tube Q1 is turned on again, the inductance coil L and a filter capacitor C3 form a reverse current, and energy of the inductance coil L recoils to the filter capacitor C3 to form a gradually decreasing current i4 until an end of the period at a moment t5 when the current decreases to zero; and a next oscillation period starts.

It may be known from the above process, at the moment t4, a voltage between the D electrode/S electrode of the MOS tube Q1 crosses a zero point, and during oscillation of the MOS tube Q1, the moment when the voltage between the D electrode/S electrode crosses the zero point, an on/off state is switched.

Further, in FIG. 3 and FIG. 4, a synchronous detection unit 25 is configured to detect an oscillation voltage of the parallel LC oscillator 24. Specifically, according to FIG. 4, the synchronous detection unit 25 mainly includes a zero-crossing comparator U1 configured to sample and detect a zero-crossing point of a voltage signal of the D electrode of the MOS tube Q1, for controlling the switch of on/off of the MOS tube Q1 by only the MCU controller 21 according to a zero-crossing moment.

The embodiments of FIG. 3 and FIG. 4 further provides detecting a peak voltage of the parallel LC oscillator 24 to control an output peak detection unit 26, which mainly includes:

- an operational amplifier U2, a sampling end in− of the operational amplifier U2 being connected to the D electrode of the MOS tube Q1 and configured to sample a voltage of the D electrode of the MOS tube Q1 and output an operational result through a diode D2;
- a hold capacitor C2, connected to an output end of the operational amplifier U2, so that the operational amplifier U2 may be kept or locked to output the peak voltage by using the hold capacitor C2, where for example, in the time period from t2 to t3 of the voltage changing period shown in FIG. 4, the operational amplifier U2 outputs a gradually increasing voltage, the hold capacitor C2 receives and stores the output voltage, until the moment t3 when the output voltage of the operational amplifier U2 reaches a maximum value, and voltages at two ends of the hold capacitor C2 synchronously become maximum; after the moment t3, the output voltage of the operational amplifier U2 gradually decreases until decreases to zero; however, because the hold capacitor C2 does not discharge, the voltages at the two ends remain at a peak value; and
- a voltage follower U3, following to outputting the peak voltage held by the hold capacitor C2.

Figure 5:
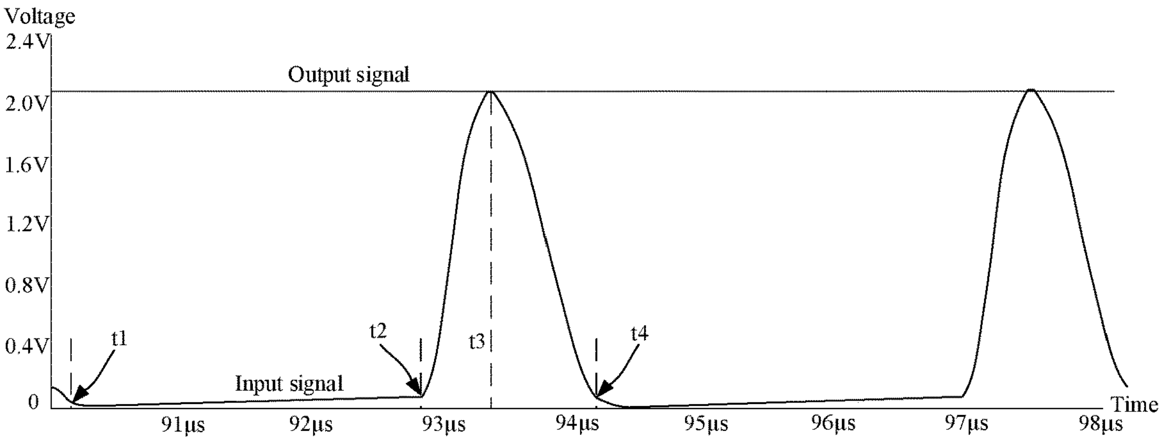
FIG. 5 is a schematic diagram of an input signal and an output signal of a peak detection unit according to an embodiment.

FIG. 5 shows, in two oscillation period of the parallel LC oscillator 24 driven with a duty ratio of 70%, comparison between an input signal sampled by the sampling end in− of the operational amplifier U2 of the peak detection unit 26 and an output signal outputted by an output end of the voltage follower U3. It may be seen from FIG. 5, an output of the peak detection unit 26 is always the peak voltage of the parallel LC oscillator 24. In addition, in FIG. 5, it may be seen from a waveform of the input signal, a time length for which a voltage peak appearing in the input signal is much less than a time length for the voltage being basically close to zero, that is, the oscillation is asymmetrical; and from a shape of a wave peak of the voltage in FIG. 5, a time length for which the voltage basically close to zero (t2) increases to the peak voltage (t3) is also different from a time length for which the voltage decreases from the peak voltage to close to zero (t4), and specifically in FIG. 5, the wave peak increases quickly and decreases slowly. Compared with a symmetrical resonance with a duty ratio of 50% in FIG. 4, using an asymmetrical peak voltage much greater than the voltage with a duty ratio of 50%, low efficiency caused by short charging time of the inductance coil L during oscillation of the parallel LC oscillator 24 driven with a duty ratio of 50% may be improved. According to the above test of this application, in a preferred implementation, using the pulse with a duty ratio of over 50% to drive the parallel LC oscillator 24 to oscillate to heat. In a more preferred implementation, the duty ratio is greater than 70%. In this way, with a long charging time and a short discharging time in the oscillation period, a required power and voltage can be kept.

By using the above hold capacitor C2 and voltage follower U3, the output of the peak voltage can be kept at any moment during oscillation, so that the MCU controller 21 can obtain or sample to detect a peak voltage of the oscillation at any moment.

In a preferred implementation shown in FIG. 3, the operational amplifier U2 is used as a comparator in a basic use manner. Specifically, a reference signal input end in+ of the operational amplifier U2 is connected to a fixed signal of an output signal by using a capacitor, and the operational amplifier U2 outputs, as a comparator, a comparison operation result between an oscillation voltage signal of the parallel LC oscillator 24 and a fixed reference signal. That is, when the voltage signal sampled by the sampling end in− of the operational amplifier U2 is greater than a reference voltage signal inputted by the input end in+, the operational amplifier U2 outputs a comparison result to the hold capacitor C2 for keeping, and until the voltage signal sampled by the sampling end in− is a peak value, the voltage received by the hold capacitor C2 is maximum and is the peak voltage.

Further, in a preferred implementation shown in FIG. 3, based on a conventional following output connection manner, a sampling end in+ of the voltage follower U3 is connected to a sampling end in+ of the operational amplifier U2. In addition, the peak detection unit 26 further includes several basic components such as resistors and capacitors, which are configured for basic functions of voltage dividing, voltage regulation, and current limiting.

Specifically, in an implementation shown in FIG. 3, a negative terminal of the hold capacitor C2 in the peak detection unit 26 is grounded, and a positive terminal includes three paths, where

- a first path is connected to the output end of the operational amplifier U2, to receive a voltage outputted by the operational amplifier U2;
- a second path is connected to a sampling end in− of the voltage follower U3, so that the voltage follower U3 can output the peak voltage held by the hold capacitor C2; and
- a third path is ground through the switch tube Q2, and the MCU controller 21 discharges the positive terminal of the hold capacitor C2 to zero by turning on the switch tube Q2, which facilitates subsequent sampling of a peak voltage during oscillation.

Another embodiment of this application further provides a control method for automatically detecting or adjusting a duty ratio of an oscillation frequency or a pulse control signal of a vapor generation device based on the peak detection unit 26.

Figure 6:
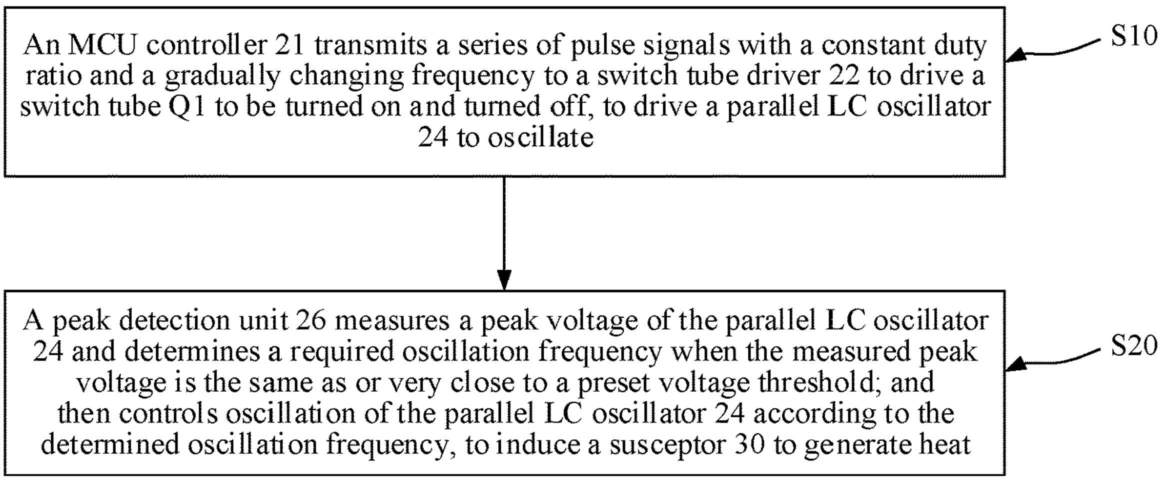
FIG. 6 is a schematic diagram of a control method for a vapor generation device according to an embodiment.

FIG. 6 shows steps of a method for controlling automatic detection of a vapor generation device and adjusting the vapor generation device to adapt to an oscillation frequency with a given duty ratio, including the following.

S10: The MCU controller 21 transmits, in the given duty ratio, a series of pulse signals with a frequency gradually changing to the switch tube driver 22 to drive the switch tube Q1 to be turned on/off, to drive the parallel LC oscillator 24 to oscillate.

S20: During the implementation of step S10, the peak detection unit 26 measures a peak voltage of the parallel LC oscillator 24, and determines a required optimal oscillation frequency when the measured peak voltage is the same as or very close to a preset voltage threshold; and the MCU controller 21 induces, according to the determined optimal oscillation frequency, the susceptor 30 to generate heat.

In step S10, a series of pulse signals containing a frequency gradually changing are transmitted in a constant duty ratio (such as 50% or 70%) that is set, to drive the parallel LC oscillator 24 to oscillate, which is to find a relationship combination between an optimal frequency and an optimal duty ratio at a required output power in a frequency sweeping manner, and then drive, according to the optimal frequency and duty ratio, the parallel LC oscillator 24 to oscillate, to control the susceptor 30 to generate heat.

In the above preferred implementation, as a pulse signal for frequency sweeping, the frequency of the pulse signal, preferably, gradually decreases. In a case that the set duty ratio is unchanged during frequency sweeping, a greater frequency indicates a shorter period, the peak voltage of the oscillation is proportional to a total current, and the total current I is an integral of current i and time t, denoted as $\Sigma(di/dt)$. Correspondingly, during frequency sweeping, the detected peak voltage changes in ascending order, which is beneficial for safely finding a frequency at a preset voltage threshold.

In addition, during implementation, a quantity of pulses included in the pulse signal for frequency sweeping is kept in a range of 5 to 50, and preferably, in a range of 5 to 10.

In a preferred implementation, during frequency sweeping, each time the peak voltage is detected, the switch tube Q2 is turned on to discharge the positive terminal of the hold capacitor C2 to zero, resetting the peak detection unit 26.

In detection comparison of operation of the circuit 20, it is basically difficult to detect that the peak voltage is exactly the same as the preset voltage threshold, and generally based on implementation experience, it is usually appropriate to determine the detection result by determining that an error between the two is less than 0.25% of the preset voltage threshold, which is basically close or very close. For example, in a case that the peak voltage of an ideal optimal oscillation efficiency is 40 V, the detected peak voltage reaches 39 V in an actual frequency sweeping test may basically be considered that an optimal frequency is found. Certainly, in another optional implementation, if during operation of the circuit 20, stabilities of components and data may have deviation, if a more accurate result can be implemented, a determining standard of the error between the two may further be reduced, for example, the error between the two is less than 0.1% of the preset voltage threshold.

Figure 7:
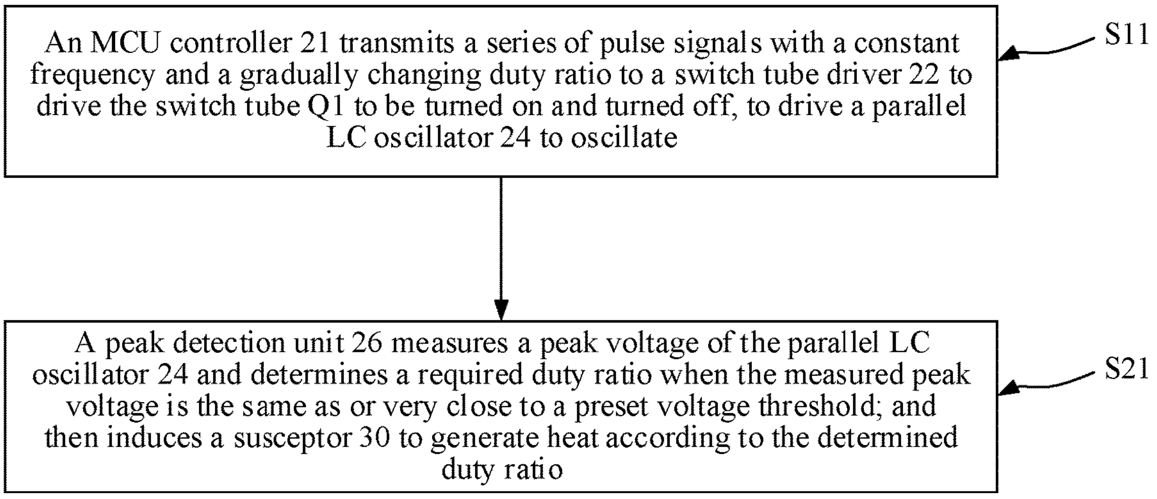
FIG. 7 is a schematic diagram of a control method for a vapor generation device according to another embodiment.

FIG. 7 shows steps of a method for controlling automatic detection of a vapor generation device to adapt to a duty ratio of a control signal of a parallel LC oscillator 24 with a given frequency according to another embodiment, which includes the following.

S11: The MCU controller 21 transmits, in the given frequency, a series of pulse signals with a duty ratio gradually changing, to control the switch tube Q1 to be turned on/off, to drive the parallel LC oscillator 24 to oscillate; and the preset frequency may be 200 KHz, 300 KHz, 350 KHz, or the like, and certainly, the given frequency during duty ratio scanning is constant.

S21: During the implementation of step S11, a peak detection unit 26 measures a peak voltage of the parallel LC oscillator 24, when the detected peak voltage is the same as or very close to a preset voltage threshold, determines a duty ratio corresponding to the current peak voltage as an optimal duty ratio of a selected frequency, and then drives the parallel LC oscillator 24 to oscillate according to the pulse signal of the duty ratio, to induce a susceptor 30 to generate heat.

In the above implementation, as a pulse signal for scanning duty ratio, the duty ratio gradually increases. In a case that the frequency is unchanged during duty ratio scanning, a greater duty ratio indicates a corresponding longer on time of the switch tube Q1. Correspondingly, during duty ratio sweeping, the detected peak voltage changes in ascending order, which is beneficial for safely finding a frequency at a preset voltage threshold. Similarly, during detection, each time the peak voltage is detected, a switch tube Q2 is turned on to discharge a positive terminal of a hold capacitor C2 to zero, resetting a peak detection unit 26.

Figure 8:
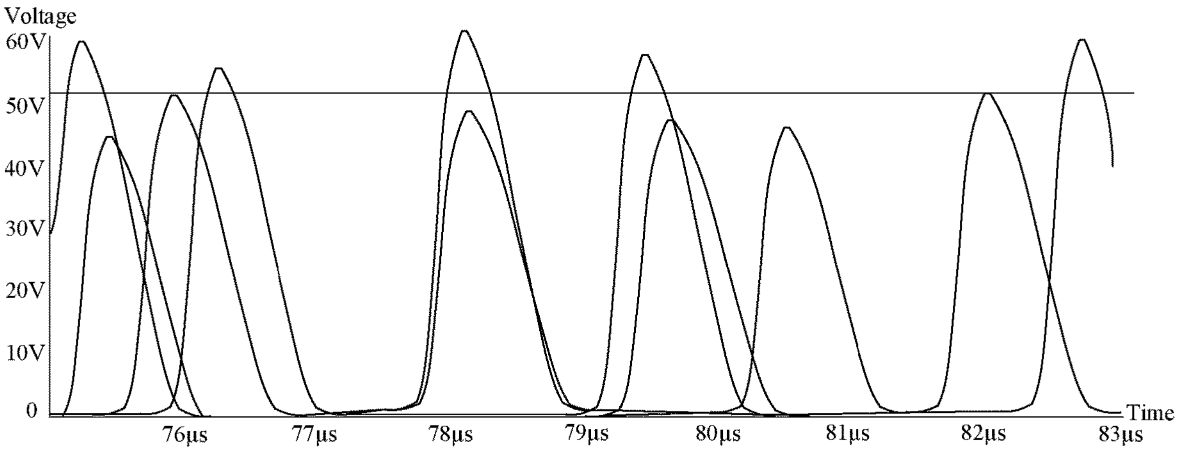
FIG. 8 is a schematic diagram of an oscillation voltage during duty ratio scanning in the control method in FIG. 7.

In a specific implementation, FIG. 8 shows a waveform of an oscillation voltage under a pulse signal of finding a duty ratio with a given frequency of 200 KHz (that is, a period is 5 μs) and a threshold voltage of 40 V; and starting with an on time of 2 μs (that is, the duty ratio is 2 μs/5 μs=40%) of the switch tube Q1, each pulse increases an on time of 0.2 μs to scan the duty ratio. When sweeping an on time of 3.6 μs, the peak voltage is closest to 20 V. Subsequently, the parallel LC oscillator 24 is driven to oscillate with a duty ratio of 3.6 μs/5 μs=72% and a frequency of 200 KHz, which is the most suitable for obtaining required heating efficiency.

The above threshold voltage of 40 V is set according to heating efficiency required by a product in an embodiment, which is obtained through experience during prototype debugging, and the value can ensure rapid temperature rise without damaging an inverter circuit and keep a margin of about 25%.

In another variant implementation, when a heating temperature or heating efficiency required by a user changes, or an aerosol generation product A requiring a different heating temperature is used, the required threshold voltage may further be adjusted, in the above manner, to perform frequency sweeping or duty ratio scanning to find a frequency or a duty ratio suitable for the required heating temperature or heating efficiency.

The above method in this application, by using the peak detection unit 26, may implement detecting the peak voltage during oscillation, and the peak voltage of oscillation and the heating efficiency are correlative, so that a suitable driving frequency or duty ratio may be found automatically based on a product or requirements.

Figure 9:
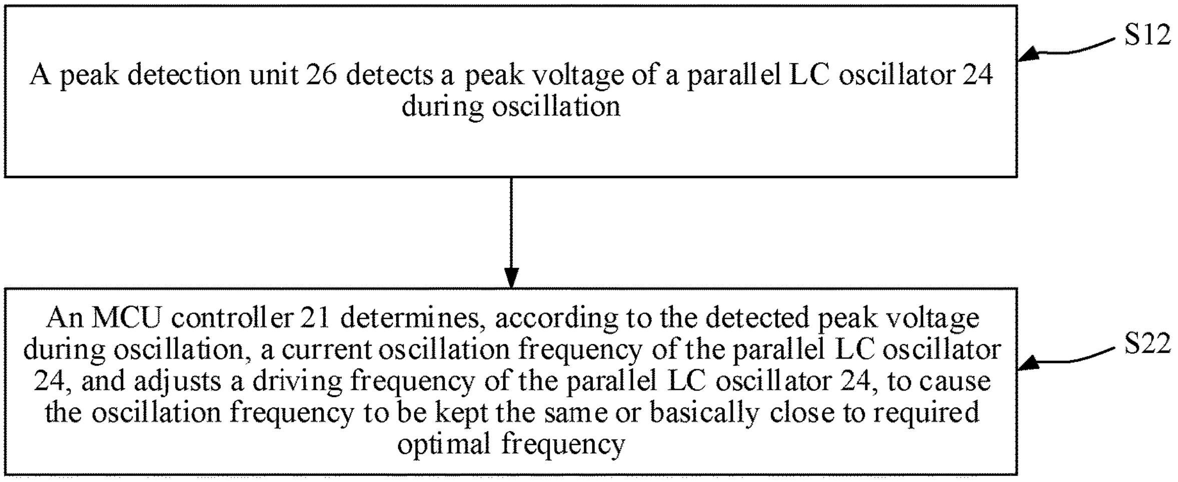
FIG. 9 is a schematic diagram of a control method for a vapor generation device according to another embodiment.

Another embodiment of this application further provides a method for controlling a vapor generation device to automatically adapt to an oscillation frequency, referring to FIG. 9, which includes the following.

S12: A peak detection unit 26 detects a peak voltage of a parallel LC oscillator 24 during oscillation.

S22: An MCU controller 21 determines, according to the detected peak voltage during oscillation, a current oscillation frequency of the parallel LC oscillator 24, and adjusts a driving frequency provided for driving the parallel LC oscillator 24, to cause the oscillation frequency to be kept the same or basically close to a required optimal frequency.

In this embodiment, the current oscillation frequency is reversely calculated by using a correlation relationship between the peak voltage detected by the peak detection unit 26 and the frequency, and then a frequency outputted through automatically adjustment is the same as or basically close to a preset oscillation frequency. During implementation, a suitable or detected object may be adapted to a serial LC oscillator.

Figure 10:
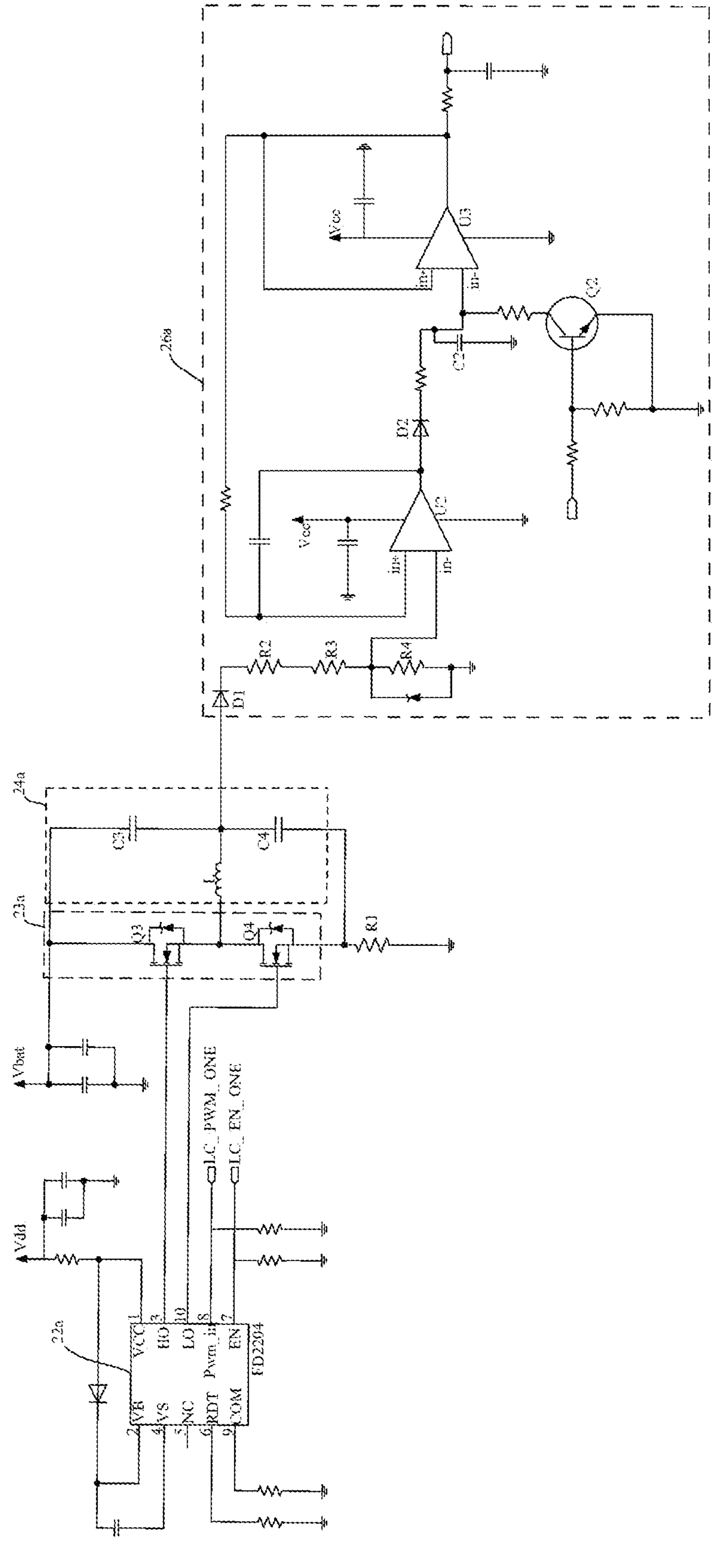
FIG. 10 is a schematic diagram of basic components of an embodiment of the circuit in FIG. 1.
Figure 11:
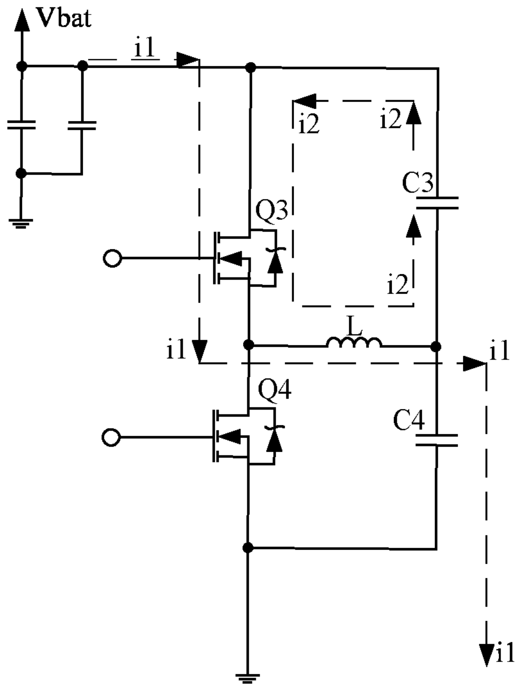
FIG. 11 is a schematic diagram of a forward current in a stage of an LCC oscillator in FIG.

For example, FIG. 10 shows a structure and basic components of a circuit 20 of a serial LCC oscillator 24*a* according to another embodiment of this application. The serial LCC oscillator 24*a* implements resonance, to cause an inductance coil L inside to generate an alternating magnetic field. During oscillation of the serial LCC oscillator 24*a*, current conversion is controlled by a half bridge formed by a switch tube Q3 and a switch tube Q4; and switch of on/off of the switch tube Q3 and the switch tube Q4 is controlled by a switch tube driver 22*a*. Specifically, an oscillation process of the serial LCC oscillator 24*a* refers to FIG. 11 and FIG. 12, which includes the following:

S100: As shown in FIG. 11, when the switch tube Q3 is turned on and the switch tube Q4 is turned off, a cell 10 charges a capacitor C4 through a current i1, and a capacitor C3 discharges through a current i2 at the same time. In this process, a current flowing from left to right through the inductance coil L, as shown in FIG. 11, may be denoted as a current in a positive direction. In this stage S100, the capacitor C3 starts discharging when being turned on by the switch tube Q3, and finishes discharging when a voltage difference between two ends is zero, and charging stops when a voltage between two ends of the capacitor C4 increases to equal to an output voltage of the cell 10. In this case, the current of the inductance coil L is a resonance peak value and is a maximum.

S200: After completing the stage S100, the switch tube Q3 is kept in a turned-on state and the switch tube Q4 is kept in a turned-off state, the inductance coil L discharges in the same direction as the current i2 in FIG. 1 to charge the capacitor C3, so that the current flowing through the inductance coil L in the positive direction gradually decreases until the current of discharging of the inductance coil L is zero. In this stage, because the capacitor C3 fully discharges in the stage S100, a loop formed by the inductance coil L through the switch tube Q3 with the capacitor C3 has basically no impedance. Therefore, in the stage S200, the inductance coil L is mainly for discharging to charge the capacitor C3, and during discharging, the current flowing through the inductance coil L is the same as the current i2 in the stage S100. The capacitor C4 has been basically charged to have a same voltage as the output voltage of the cell 10 in the stage S100, and in the stage S200, the inductance coil L compensates for a second capacitor C2 in a very small amount, which, however, may basically be ignored.

During a complete process of the stage S100 and the stage S200, a total current flowing through the inductance coil L increases from zero to a maximum in the positive direction, and then decreases to zero through discharging of the inductance coil L, and the current flowing through the inductance coil L is always in the positive direction from left to right.

Figure 12:
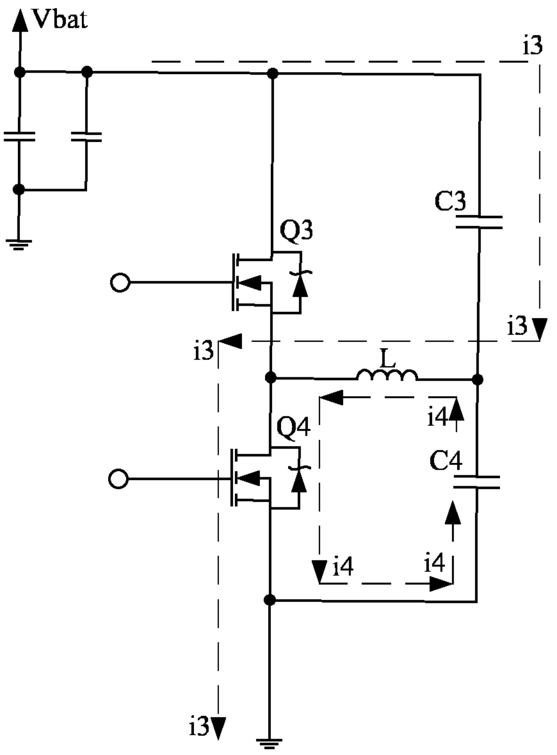
FIG. 12 is a schematic diagram of a reverse current in a stage of an LCC oscillator in FIG. 10.

S300: After completing step S200, the switch tube Q3 is turned off, and the switch tube Q4 is turned on; and the switch tube Q2 starts to be turned on, loops of a current i3 and a current i4, as shown in FIG. 12, are generated in the LCC oscillator 24*a*. According to current paths shown in FIG. 12, the current i3 flows from a positive electrode of the cell 10 through the capacitor C3, the inductance coil L, and the switch tube Q4 sequentially, and through grounding to a negative electrode of the cell 10 to form a loop; and at the same time, the current i4 flows from a positive terminal of the capacitor C4, along a counterclockwise direction shown in the figure, through the inductance coil L and the switch tube Q4 to a negative terminal of the capacitor C4 to form a loop. In this process, a current flowing through the inductance coil L from right to left as shown in FIG. 12, which is opposite to the current direction in FIG. 11 and may be denoted as a current in a negative direction.

The stage S300 includes both charging the capacitor C3 and discharging the capacitor C4; and when the voltage of the capacitor C3 increases to equal to the output voltage of the cell 10, and a voltage difference between two ends of the capacitor C4, the current of the inductance coil L is a resonance peak value and is maximum.

S400: After completing the stage S300, the switch tube Q2 is still kept in the turned-on state, the inductance coil L charges the capacitor C4 in an opposite direction, so that the current flowing through the inductance coil L in the negative direction gradually decreases until the current of discharging of the inductance coil L is zero.

During a complete process of step S300 and step S400, a total current flowing through the inductance coil L increases from zero to a maximum in the opposite direction, and then decreases to zero through discharging of the inductance coil L.

Figure 13:
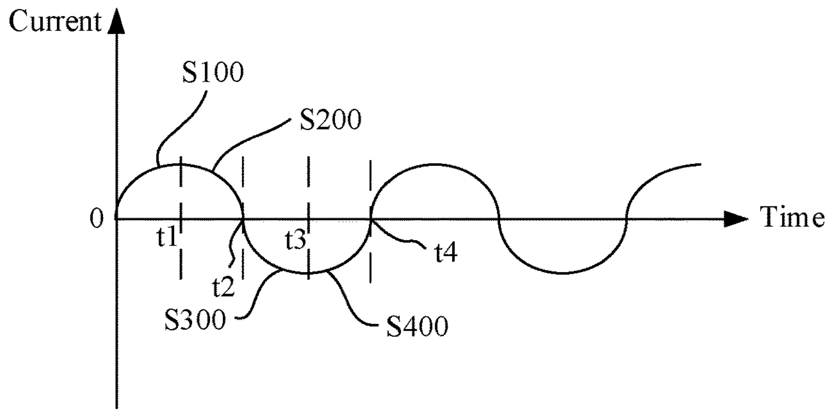
FIG. 13 is a schematic diagram of a resonance current of a serial LCC oscillator in FIG. 10.

Therefore, during oscillation of the LCC oscillator 24*a*, the current flowing through the inductance coil L changes as shown in FIG. 13. A complete current period includes four parts in FIG. 13 respectively corresponding to the above stage S100, S200, S300, and S400. In step S100 to step S400, on/off states of the switch tube Q3 and the switch tube Q4 are alternately switched, cyclically generating the above oscillation process in the LCC oscillator 24*a* to form an alternating current flowing through the inductance coil L.

Therefore, based on the above control process, the LCC oscillator 24*a* in the implementation generates inversion by using a ZCS (zero current switch) inverter topology, different from a ZVS (zero voltage switch) inverter topology of the above parallel LC oscillator 24; and the switch tube Q3 and the switch tube Q4 are configured to switch the on/off state when the current flowing through the inductance coil L is zero.

Current conversion during oscillation of the LCC oscillator 24*a* is controlled by a half bridge formed by the switch tube Q3 and the switch tube Q4. Certainly, based on the same implementation, a person skilled may replace or adopt a full-bridge circuit including four switch tubes to drive the LCC oscillator 24*a* to oscillate.

Further, referring to an embodiment shown in FIG. 3, a half-bridge driver 22*a* adopts a commonly-used switch tube driver of model FD2204, controlled by the MCU controller 21 in a PWM manner. According to a pulse width of the PWM, I/O interfaces 3 and 10 transmit high level/low level alternately to drive the on time of the switch tube Q3 and the switch tube Q4, to control the oscillation of the LCC oscillator 24*a*.

Figure 14:
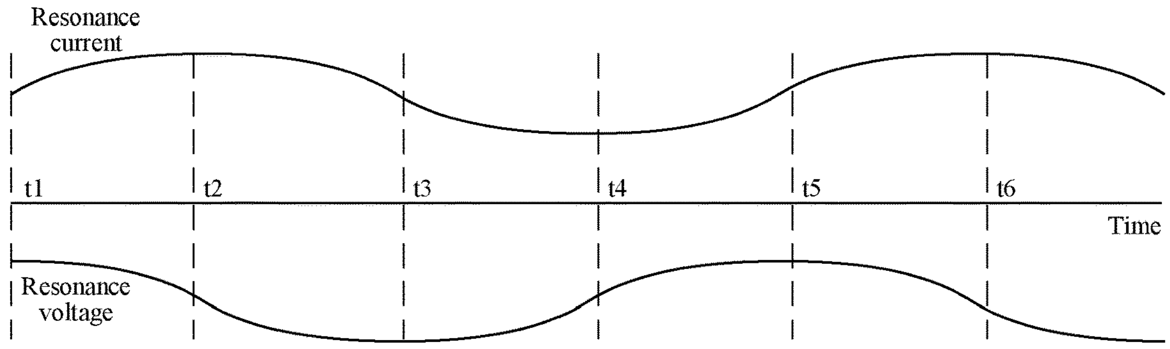
FIG. 14 is a schematic diagram of a changing resonance current and a changing resonance voltage tested by a serial LCC oscillator in FIG. 10.

In addition, from the above process, during oscillation of the serial LCC oscillator 24*a*, the current or the voltage is a symmetrical sine or cosine resonance curve with the duty ratio of basically constant at 50%, and the corresponding MCU controller 21 drives the switch tube Q3 and the switch tube Q4 to be turned on or turned off using a PWM pulse signal with the duty ratio of 50%. During implementation, intensity of the resonance voltage is related to and ahead of the resonance current, for example, the changes are shown in FIG. 14, the resonance voltage is about ¼ ahead of the resonance current, and the overall LCC oscillator 24*a* is weakly inductive. “Capacitive” and “inductive” are electrical terms related to mixed circuits of electronic devices (such as the LC oscillator or LCC oscillator 24*a* above). When capacitive reactance of a mixed circuit is larger than inductive reactance, the circuit is “capacitive”, and when the inductive reactance is larger than the capacitive reactance, the circuit is inductive. A “weakly inductive” state is a state that the inductive reactance is basically close to the capacitive reactance and the inductive reactance is slightly greater than but not much greater than the capacitive reactance.

Similarly, in the implementation shown in FIG. 10, the circuit 20 further includes a peak detection unit 26*a*, configured to detect a peak voltage of the LCC oscillator 24*a*.

The embodiment shown in FIG. 10 further includes several conventional basic components, such as resistance for voltage dividing and current limiting, diodes for preventing reverse currents, and capacitors for voltage regulation and filtering.

Further, the MCU controller 21 of the vapor generation device can also find a frequency that is most suitable for an output power or heating efficiency through frequency sweeping and using the detection of the above peak detection unit 26*a*. A specific implementation is the same as the frequency sweeping of the parallel LC oscillator 24, which is transmitting a series of pulse signals with changing frequencies to drive the LCC oscillator 24*a* to oscillate, and determining the resonance frequency of the LCC oscillator 24*a* when the detected peak voltage becomes maximum, to control, in the resonance frequency obtained by frequency sweeping, the LCC oscillator 24*a* to oscillate and induce the susceptor 30 to generate heat.

Certainly, during frequency sweeping of the LCC oscillator 24*a*, the LCC oscillator 24*a* is a sine resonance with the duty ratio of 50%; therefore, corresponding to the process of frequency sweeping, in a case that the driving frequency is the same as or very close to the resonance frequency of the LCC oscillator 24*a*, the resonance voltage can reach a maximum; in a case that the driving frequency deviates from the resonance frequency of the LCC oscillator 24*a*, the resonance voltage becomes smaller; and only in a case that the driving frequency is the same as or very close to the resonance frequency, the LCC oscillator 24*a* is basically completely resonant, and in this case, the resonance voltage can be reached; that is, when the driving frequency is greater than the resonance frequency, an obvious correspondence exists between the driving frequency and the resonance voltage.

Figure 15:
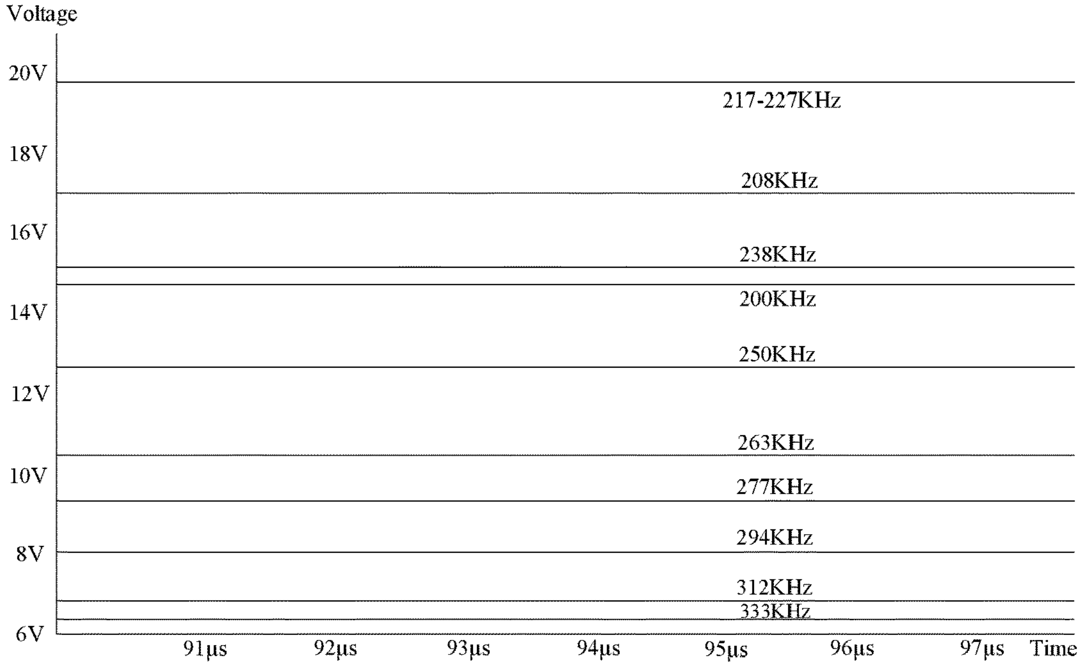
FIG. 15 is a schematic diagram of a peak voltage detected in a process in which a serial LCC oscillator is driven to oscillate by using a pulse signal with a frequency changing in a range of 333 KHz to 200 KHz in descending order according to an embodiment.

For example, FIG. 15 is a diagram of a peak voltage detected during frequency sweeping with a frequency ranging from 333 KHz to 200 KHz in descending order according to an embodiment. During frequency sweeping, the peak voltage is gradually increased; the peak voltage becomes maximum until the frequency reaches a region from 217 KHz to 227 KHz; and when the driving frequency is continuously reduced to 200 KHz, the peak voltage is reduced. With relatively broad or vague precision requirements, a range from 217 KHz to 227 KHz may be considered as a resonance frequency range of the LCC oscillator 24*a* of this embodiment. Based on requirements for accuracy, a user can choose an amplitude of each frequency adjustment during implementation of the frequency sweeping. Certainly, a greater amplitude indicates lower accuracy, but can shorten the frequency sweeping time to improve the detection efficiency; and each time an amplitude adjusted is lower, the accuracy is higher, but time consumed correspondingly increases, reducing the efficiency. In an optional implementation, it is suitable for performing frequency sweeping with an adjustment amplitude ranging from 1 KHz to 30 KHz.

Certainly, if the accuracy of the detected resonance frequency is required to further improved, the above operation of frequency sweeping may be continued according to a frequency change rate of 0.5 KHz between 217 KHz and 227 KHz until a frequency of a maximum peak voltage is found, which is a more accurate resonance frequency.

Figure 16:
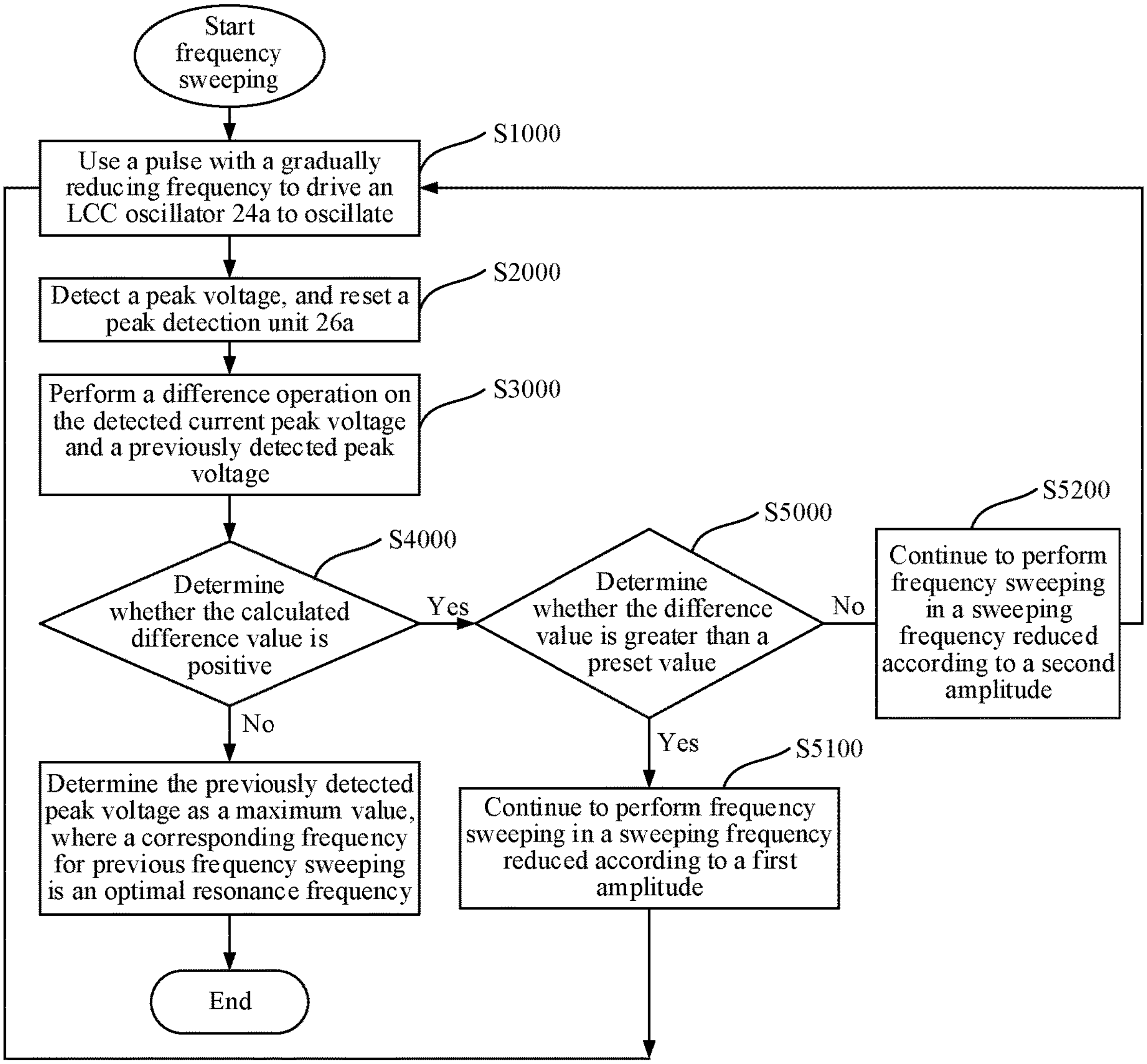
FIG. 16 is a flowchart of searching for a resonance frequency by performing a frequency sweeping method through a variable step size algorithm according to an embodiment.

Based on the above, another embodiment of this application further provides a frequency sweeping method for rapidly searching for a resonance frequency through a variable step size algorithm. Referring to FIG. 16, the method includes the following steps.

S1000: Start frequency sweeping from a set initial frequency value.

S2000: Drive the LCC oscillator 24*a* to oscillate according to the current sweeping frequency.

S3000: Detect a peak voltage of the LCC oscillator 24*a* during oscillation, and perform a difference operation on the peak voltage and a previously detected peak voltage.

S4000: Determine whether a calculated difference value is a positive value; if yes, further perform step S5000; or otherwise, determine the current sweeping frequency is a resonance frequency to be found.

S5000: Determine whether the difference value is greater than a preset value; if yes, perform step S5100; or otherwise, perform step S5200.

S5100: Continue to perform frequency sweeping in a sweeping frequency reduced according to a first amplitude.

S5200: Continue to perform frequency sweeping in a sweeping frequency reduced according to a second amplitude.

The first amplitude is greater than the second amplitude, for example, the first amplitude may optionally be 5 KHz, 10 KHz, 15 KHz, 20 KHz, 22 KHz, 25 KHz, 30 KHz, or the like; and the second amplitude may be 0.5 KHz, 1 KHz, 1.5 KHz, 2 KHz, 5 KHz, or the like.

The above embodiment, by using the peak voltage detection and rapid searching algorithm, during frequency sweeping, automatically adjusts an amplitude of frequency reduction according to the difference value between the current peak voltage and the previous peak voltage; when the peak voltages of two adjacent detections become closer and to a same value, the amplitude of the sweeping frequency becomes smaller; and time can be greatly shorten in an early stage, and accuracy can be greatly improved in a later stage. Therefore, before starting heating, the resonance frequency of the LCC oscillator 24*a* can be rapidly and accurately obtained.

In another variant implementation, a process of oscillation of a serial LC oscillator is similar to the process of the oscillation of the LCC oscillator 24*a*, and a voltage/current is also a symmetrical sine or cosine resonance curve during oscillation. In addition, efficiency of the serial LC oscillator also becomes maximum during resonance. Therefore, the above frequency sweeping and peak voltage detection manner both can be used for controlling a vapor generation device with a serial LC oscillator.

It should be noted that, the specification of this application and the accompanying drawings thereof illustrate preferred embodiments of this application, but are not limited to the embodiments described in this specification, furthermore, a person of ordinary skill in the art may make improvements or modifications according to the foregoing description, and all the improvements and modifications shall fall within the protection scope of the appended claims of this application.

The invention claimed is:

1. A vapor generation device, configured to heat a vapor generation product to generate an aerosol for inhalation, and comprising:

a susceptor, configured to be penetrated by a changing magnetic field to generate heat, to heat the vapor generation product;

an oscillator, comprising an inductance coil and a capacitor, and configured to guide a changing current to flow through the inductance coil to drive the inductance coil to generate the changing magnetic field;

a peak detection unit, configured to detect a peak voltage of the oscillator; and a controller, configured to control the oscillator to guide the changing current based on the peak voltage;

wherein the oscillator is a parallel LC oscillator comprising the inductance coil and the capacitor connected in parallel, and the controller is configured to drive, using a pulse with a changing frequency. the parallel LC oscillator to oscillate, determine an optimal frequency of the parallel LC oscillator according to the peak voltage detected by the peak detection unit. and control the parallel LC oscillator to guide the changing current according to the optimal frequency; wherein in the pulse with a changing frequency, the frequency gradually changes in descending order; or wherein the oscillator is a serial LC oscillator or a serial LCC oscillator comprising the inductance coil and the capacitor connected in series. and the controller is configured to drive, using a pulse with a changing frequency, the oscillator to oscillate, and determine a resonance frequency of the oscillator according to the peak voltage detected by the peak detection unit. wherein in the pulse with a changing frequency. the duty ratio is constant and the frequency gradually changes in descending order.

2. The vapor generation device according to claim 1, wherein the peak detection unit comprises:

a hold capacitor, configured to hold the peak voltage of the oscillator;

an operational amplifier, located between the hold capacitor and the oscillator, and further configured to output a voltage of the oscillator to the hold capacitor; and a voltage follower, configured to output the peak voltage of the oscillator held by the hold capacitor.

3. The vapor generation device according to claim 2, wherein the peak detection unit further comprises:

a discharge switch, configured to discharge the hold capacitor in an on state.

4. The vapor generation device according to claim 1, wherein the controller is configured to determine the optimal frequency of the parallel LC oscillator in a case that the peak voltage detected by the peak detection unit is the same as or it is determined that a difference between the peak voltage and a preset threshold voltage is less than 0.25% of the preset voltage threshold.

5. The vapor generation device according to claim 1, wherein the oscillator is a parallel LC oscillator comprising the inductance coil and the capacitor connected in parallel; and the controller is configured to drive, using a pulse with a changing duty ratio, the parallel LC oscillator to oscillate, determine an optimal duty ratio of the parallel LC oscillator according to the peak voltage detected by the peak detection unit, and control the parallel LC oscillator to guide the changing current according to the optimal duty ratio.

6. The vapor generation device according to claim 5, wherein the controller is configured to determine the optimal duty ratio of the parallel LC oscillator in a case that the peak voltage detected by the peak detection unit is the same as or it is determined that a difference between the peak voltage and a preset threshold voltage is less than 0.25% of the preset voltage threshold.

7. The vapor generation device according to claim 5, wherein in the pulse with a changing duty ratio, the duty ratio gradually changes in ascending order.

8. The vapor generation device according to claim 1, wherein the controller is configured to determine the resonance frequency of the oscillator in a case that the peak voltage detected by the peak detection unit is maximum.

9. A control method for a vapor generation device, wherein the vapor generation device comprising:

a susceptor, configured to be penetrated by a changing magnetic field to generate heat, to heat the vapor generation product; and an oscillator, comprising an inductance coil and a capacitor, and configured to guide a changing current to flow through the inductance coil to drive the inductance coil to generate the changing magnetic field; and the method comprises:

detecting a peak voltage of the oscillator; and determining an oscillation frequency of the oscillator according to the peak voltage;

wherein the oscillator is a parallel LC oscillator comprising the inductance coil and the capacitor connected in parallel and the controller drives, using a pulse with a changing frequency, the parallel LC oscillator to oscillate, determines an optimal frequency of the parallel LC oscillator according to the peak voltage detected by the peak detection unit, and controls the parallel LC oscillator to guide the changing current according to the optimal frequency, wherein in the pulse with a changing frequency, the frequency gradually changes in descending order; or wherein the oscillator is a serial LC oscillator or a serial LCC oscillator comprising the inductance coil and the capacitor connected in series and the controller drives, using a pulse with a changing frequency, the oscillator to oscillate, and determines a resonance frequency of the oscillator according to the peak voltage detected by the peak detection unit, wherein in the pulse with a changing frequency, the duty ratio is constant, and the frequency gradually changes in descending order.

10. The control method for a vapor generation device according to claim 9, wherein after the determining an oscillation frequency of the oscillator according to the peak voltage, the method further comprises:

adjusting the oscillation frequency of the oscillator, so that the oscillation frequency is kept the same as er basically close to a preset frequency.

11. The control method for a vapor generation device according to claim 9, wherein the oscillator is a parallel LC oscillator; and the method comprises:

using a pulse with a gradually changing frequency or duty ratio to drive the parallel LC oscillator to oscillate; detecting a peak voltage of the parallel LC oscillator; comparing the peak voltage with a preset threshold voltage, and determining an optimal frequency or an optimal duty ratio of the parallel LC oscillator in a case that the peak voltage is the same as or it is determined that a difference between the peak voltage and a preset threshold voltage is less than 0.25% of the preset voltage threshold; and driving the parallel LC oscillator to oscillate according to the optimal frequency or the optimal duty ratio, so that the inductance coil generates the changing magnetic field.

12. The control method for a vapor generation device according to claim 9, wherein the oscillator is a serial LC oscillator or a serial LCC oscillator; and the method comprises:

using a pulse with a constant duty ratio and a gradually changing frequency to drive the serial LC oscillator or the serial LCC oscillator to oscillate;

detecting a peak voltage of the serial LC oscillator or the serial LCC oscillator;

determining a resonance frequency of the serial LC oscillator or the serial LCC oscillator according to a maximum value of the peak voltage; and driving, according to the resonance frequency, the serial LC oscillator or the serial LCC oscillator to oscillate, so that the inductance coil generates the changing magnetic field.

13. The control method for a vapor generation device according to claim 12, wherein in the pulse with a gradually changing frequency, the frequency gradually changes in descending order.

14. The control method for a vapor generation device according to claim 12, wherein the step of determining the peak voltage is a maximum value comprises:

performing a difference operation on a currently detected peak voltage and a previously detected peak voltage;

determining whether a difference value is positive; and if the difference value is positive, reducing the oscillation frequency of driving the serial LC oscillator or the serial LCC oscillator; or if the difference value is not positive, determining the previously detected peak voltage as the maximum value.

15. The control method for a vapor generation device according to claim 14, wherein the step of reducing the oscillation frequency of driving the serial LC oscillator or the serial LCC oscillator comprises:

determining whether the difference value is greater than a preset value; and if the difference value is greater than the preset value, reducing the oscillation frequency of driving the serial LC oscillator or the serial LCC oscillator according to a first amplitude;

or if the difference value is not greater than the preset value, reducing the oscillation frequency of driving the serial LC oscillator or the serial LCC oscillator according to a second amplitude, wherein the first amplitude is greater than the second amplitude.

16. A vapor generation device, configured to heat a vapor generation product to generate an aerosol for inhalation, and comprising:

a parallel LC oscillator, comprising an inductance coil and a capacitor connected in parallel, and configured to guide a changing current to flow through the inductance coil to drive the inductance coil to generate a changing magnetic field;

a susceptor, configured to be penetrated by the changing magnetic field to generate heat, to heat a vapor generation product received in a cavity;

a transistor switch; and a controller, configured to control on and off of the transistor switch by using a pulse, so as to drive the parallel LC oscillator to oscillate, to guide the changing current to flow through the inductance coil, wherein a duty ratio of the pulse is greater than 50%, wherein the controller further is configured to drive, using a pulse with a changing frequency, the parallel LC oscillator to oscillate, determine an optimal frequency of the parallel LC oscillator according to the peak voltage detected by the peak detection unit. and control the parallel LC oscillator to guide the changing current according to the optimal frequency; wherein in the pulse with a changing frequency. the frequency gradually changes in descending order.

* * * * *